United States Patent [19]

Orth et al.

[11] Patent Number: 5,320,400
[45] Date of Patent: Jun. 14, 1994

[54] FOLDING HOOD FOR MOTOR VEHICLES

[75] Inventors: Stefan Orth; Arnold Klimas, both of Sindelfingen, Fed. Rep. of Germany

[73] Assignee: Mercedes-Benz AG, Fed. Rep. of Germany

[21] Appl. No.: 29,630

[22] Filed: Mar. 11, 1993

[30] Foreign Application Priority Data

Mar. 31, 1992 [DE] Fed. Rep. of Germany ....... 4210492

[51] Int. Cl.⁵ .............................................. B60J 7/12
[52] U.S. Cl. ............................. 296/146.14; 296/107; 296/116; 296/201
[58] Field of Search ............... 296/107, 116, 117, 201, 296/146.14, 147

[56] References Cited

U.S. PATENT DOCUMENTS

| | | | |
|---|---|---|---|
| 4,572,570 | 2/1986 | Trucco | 296/146.14 X |
| 4,611,849 | 9/1986 | Trenkler | 296/201 |
| 4,693,509 | 9/1987 | Moy et al. | 296/146.14 X |
| 4,741,571 | 5/1988 | Godette | 296/107 |
| 5,100,195 | 3/1992 | Patel | 296/107 |

FOREIGN PATENT DOCUMENTS

| | | |
|---|---|---|
| 3311144 | 9/1984 | Fed. Rep. of Germany . |
| 4128115 | 11/1992 | Fed. Rep. of Germany . |
| 222817 | 10/1986 | Japan .................................. 296/107 |

*Primary Examiner*—Dennis H. Pedder
*Attorney, Agent, or Firm*—Evenson, McKeown, Edwards & Lenahan

[57] ABSTRACT

A folding hood for motor vehicles has a dimensionally stable rear window, especially made of mineral glass, which, when the hood is closed, is connected along its lower edge side via a rigidly tensioned tensioning means to a material-retaining hoop forming the lower termination of the hood. When the hood is folded down, the rear window can be folded downwards into a storage position about an axis extending approximately parallel to the lower edge side of the rear window. In order to prevent drumming noises produced during driving operation by flapping movements of the rear window, a support device is arranged on the material retaining hoop, by which the rear window is supported, close to its lower edge side, transversely to the direction of tension of the tensioning means on the material-retaining hoop, while the folding hood remains closed.

11 Claims, 1 Drawing Sheet

FOLDING HOOD FOR MOTOR VEHICLES

BACKGROUND AND SUMMARY OF THE INVENTION

The invention relates to a folding hood for motor vehicles, and, more particularly, to a folding hood for motor vehicles, having a dimensionally stable rear window, especially of mineral glass. When the hood is closed, the rear window is connected along its lower edge side via a rigidly tensioned tensioning means to a material-retaining hoop forming the lower termination of the hood. When the hood is folded down, the rear window can be folded downwards into a storage position about an axis extending approximately parallel to the lower edge side of the rear window.

Such a folding hood has already been disclosed, for example, in German Patent Document P 41 28 115.2, which is not a prior publication. In this folding hood, the heavy rear window, made from mineral glass, is retained along its lower edge side by a fabric strip of the hood cover and along its upper edge side again by the hood cover together with a plurality of additional straps which are secured to the central tube of the main strut and rest on the corner strut.

In the closed state of the folding hood, the rear window, which is enclosed by a window frame, is thus held exclusively via flexible tensioning means by the adjoining frame members. This has the advantage that the folding hood can be folded very compactly when lowered into the associated hood box, since the bulky rear window can be lowered onto the material-retaining hoop and folded down into a bearing position resting upon the latter. The fabric strip extends under the rear window acting as a film hinge.

However, it is simultaneously necessary to accept the fact that, when the hood is closed and the vehicle is being driven, the rear window is caused to make flapping movements under the influence of air turbulence. These flapping movements, caused by pressure surges against the large-area rear window, not only result in increased mechanical stress in the region of the rear wall of the hood but also, within certain speed ranges, cause intrusive "drumming noises".

There is therefore needed a folding hood of the above-described type improved to the extent that the flapping of the window in the driving operation can be reduced so substantially that it is at least impossible for any intrusive "drumming noises" to arise.

This need is met according to the present invention by a folding hood for motor vehicles, having a dimensionally stable rear window, especially of mineral glass. When the hood is closed, the rear window is connected along its lower edge side via a rigidly tensioned tensioning means to a material-retaining hoop forming the lower termination of the hood. When the hood is folded down, the rear window can be folded downwards into a storage position about an axis extending approximately parallel to the lower edge side of the rear window. A support device is arranged on the material retaining hoop, by which the rear window is supported, close to its lower edge side, transversely to the direction of tension of the tensioning means on the material-retaining hoop, while the folding hood remains closed.

As compared with direct supporting of the rear window, supporting of the support device on the window frame has the advantage that the field of vision of the rear window cannot be restricted by the support device.

Particularly effective supporting of the rear window is achieved if the supporting forces take effect not at isolated points but virtually over the entire width of the rear window.

A proven solution here is an elongate bearing section which can be detachably connected to the material-retaining hoop to serve as a mounting for an additional support section which, for the sake of satisfactory internal damping, preferably consists of rubber or of a comparable elastomeric plastic.

A clip-type seating for the support section permits it to be simply assembled when the bearing section is attached to the material-retaining hoop.

Advantageously, the support section comprises a supporting are which is thickened, in the manner of a bead, and has a convexly rounded support side, as a result of which the supporting force acts substantially at right angles to the plane of the rear window.

By means of the bearing section, differences in curvature between the rear window and the material retaining clip can be concealed in a simple manner, since the line of the support section can be adapted to the curvature of the window.

In order for no additional lining to be necessary for the surfaces of the material-retaining hoop which remain visible from inside, the bearing section is preferably also used as a masking section for these visible surfaces.

The elongate support device can, moreover, advantageously serve to mask screw attachment means on the lower part of the window frame.

By pressing the rubber section onto the window frame with a uniform backward-directed prestress, a particularly durable quietening of the rear window in the driving operation can be achieved.

In what follows, an illustrative embodiment of the invention is explained with reference to an illustrative drawing.

Other objects, advantages and novel features of the present invention will become apparent from the following detailed description of the invention when considered in conjunction with the accompanying drawings.

DETAILED DESCRIPTION OF THE DRAWINGS

The folding hood of a convertible vehicle comprises, in a conventional manner, a supporting hood frame over which is stretched a hood cover of textile fabric. Since the folding concept of the hood is well known, no general views of the convertible vehicle or of the folding hood have been considered necessary.

Figure 1:
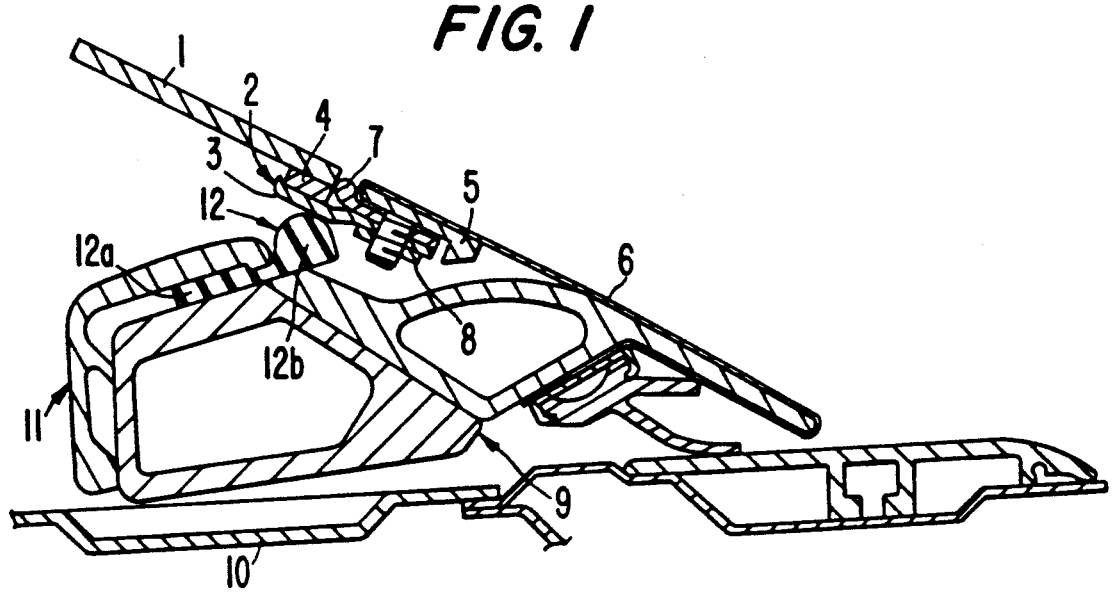
FIG. 1 is a vertical longitudinal section view through a lower terminal region of a closed folding hood.

In the sectional representation according to FIG. 1, a lower section of a rear window 1 can be seen in the design position of the window, which is circumferentially retained by a multi-part window frame 2. In this arrangement, the window frame 2 includes an internal retaining frame 3, into which the rear window 1 is bonded by means of an adhesive strip 4. A bearing frame 5 covers the retaining frame 3 adjacent to a gap between the end surfaces of the rear window 1 and the hood cover 6. In order to fix the hood cover 6 to the window frame 2, a strip of material of the hood cover 6, adjoining the window aperture, is passed around the bearing frame 5 and pressed in between the retaining frame 3 and the bearing frame 5, with the interposition of a sealing profile 7. For secure clamping of the strip of material and for simultaneous connection of the retaining frame 3 and the bearing frame 5, stay bolts project at uniform intervals over the length of the frame from the inside of the bearing frame 5 and pass through the associated holes in the retaining frame 3. A nut 8 is screwed onto each of the stay bolts and tightened. The hood cover 6 is held in a tightly stretched position below the rear window 1 by a material-retaining hoop 9 which is assembled from two hollow aluminum sections and, viewed from bottom to top, has an approximately U-shaped overall extent, forming the lower termination of the hood in the tail region of the convertible vehicle.

When lying forward in its bearing position, with the hood closed, the material-retaining hoop 9 is situated on a hood box lid 10 lying below the material-retaining hoop, and to which the latter is locked in a manner not shown. It is understood that the hood box lid 10, which can be pivoted counter to the material-retaining hoop 9, is for its part fixed in its folded-closed position by locking devices.

Below the material-retaining hoop 9, the hood cover 6, which is passed around the outer peripheral contour of the material-retaining hoop 9 without being secured, is held under stable tension.

In order to make it impossible, during driving operation of the convertible vehicle, for the rear window 1, which is held in its design position only by tensile stressing means, to be moved backwards and forwards with its lower section transversely to the plane of the window, without providing support along the lower edge side of the window frame 2, which would prevent folding-down of the rear window 1 onto the material-retaining hoop 9 in the course of the process of lowering the hood, transverse support of the lower edge region of the rear window 1 is provided by an elongate support device, which extends at the lower edge of the window over the entire width of the rear window 1.

This support device includes a decorative masking section 11 for the rear lengthwise region of the material retaining hoop 9, which is visible from the passenger compartment, and a rubber section 12 which is retained by the masking section 11 and bears by one longitudinal side in a supporting manner on the passenger compartment side of the retaining frame 3 of the rear window 1. The masking section 11 is of double-armed design and has an approximately L-shaped cross-section. The arm of the masking section 11, which extends approximately vertically when viewed in cross-section, masks the inner circumferential surface of the material-retaining hoop 9 and is screwed thereto by screw fixing devices (not shown).

Figure 2:
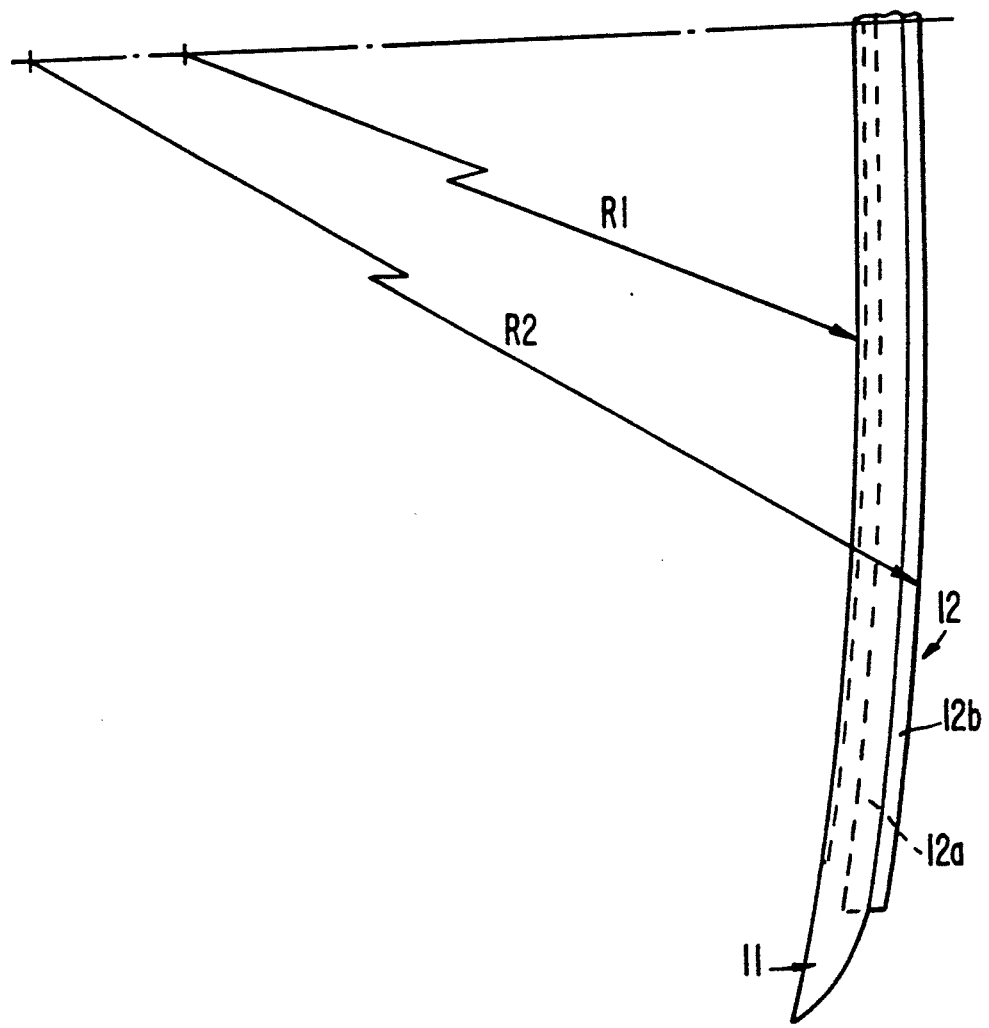
FIG. 2 is a plan view of a masking section of a material-retaining hoop of the hood.

As can be seen in combination with the plan view according to FIG. 2, which shows the half masking section 11, the arm which is secured by screws extends with a radius of curvature R1 which, based on the indicated median longitudinal axis of the vehicle, corresponds exactly to the radius of curvature of the inner circumference of the material-retaining hoop 9. As a result, the arm bears with its entire length on the counter-surface of the material-retaining hoop 9. The angled arm of the masking section 11, which is designed at a fixed angle and in this case consists of aluminum, extends approximately parallel to the top of the material-retaining hoop 9, towards the retaining frame 3, ending in a downward angled edge at a distance from the retaining frame 3. This edge engages, with an exact fit, into a longitudinal groove which is recessed into the top of the rubber section 12 in the region of transition from a parallel flat fixing arm 12a of the rubber section 12 to a supporting arm 12b thereof which is thickened in the manner of a bead. The fixing arm 12a is clamped between the underside of the backward-angled arm of the masking section 11 and the top of the material-retaining hoop 9. As a result, the supporting arm 12b, which projects relative to the edge of the masking section 11, is retained in its supporting position as shown.

In this arrangement, the edge of the masking section which engages into the associated longitudinal groove of the rubber section 12, is curved at a radius R2 relative to the center of the vehicle, which radius is substantially greater than the radius R1, since it is not adapted to the curvature of the material-retaining hoop 9 but to the curvature of the rear window 1 or of the associated window frame 2. The masking section 11 thus forms a compensating section, by means of which differences in curvature between the material-retaining hoop 9 and the rear window 1 can be compensated or visually concealed.

Since the distance between the circumference of the masking section 11 and the retaining frame 3, which is opposite thereto at a distance, is constant, the rubber section 12 can be extruded. The thickness of its supporting arm 12b is such that a longitudinal side thereof, which is rounded in an approximate semicircle in cross-section, bears with some prestress above the lower screw connection points of the window frame 2 to the retaining frame 3, as a result of which a virtually linear contact is produced.

The supporting stability of the supporting area 12b can be further improved in that a flattened underside of the supporting arm 12b rests on the material-retaining hoop 9. However, the supporting bearing must be arranged set back relative to the plane of the rear wall sufficiently for an exclusively transverse supporting of the lower part of the window frame 2 via the supporting arm 12b to be guaranteed.

Since the intermediate space between the masking section 11 and the retaining frame 3 is completely filled by the supporting arm 12b, the screw fixing means are inaccessible along the lower part of the window frame 2 when the hood is closed and are arranged to be invisible from the passenger compartment.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A folding hod for a motor vehicle having a dimensionally stable rear window and a storage position, comprising:
   a material-retaining hoop forming a low termination of the hood;
   a rigidly tensioned tensioning means for connecting the rear window along its lower edge side to the material-retaining hoop when the hood is closed, said rear window being folded downward into the storage position about an axis extending approximately parallel to the lower edge side of the rear window when the hood is folded down; and a support device arranged on the material-retaining hoop supporting the rear window at its lower edge side on the material-retaining hoop, forward of the tensioning means, transversely to a plane of the rear window while the hood remains closed.

2. A folding hood according to claim 1, further comprising a window frame enclosing the rear window, the support device resting on a lower part of the window frame.

3. A folding hood according to claim 1, wherein the rear window is substantially supported over its entire width on the support device via a window frame.

4. A folding hood according to claim 3, wherein the support device includes an elongate bearing section immovably attached to the material retaining hoop, the bearing section providing, on a longitudinal side facing the rear window, a projecting support section, viewed in cross-section, having a longitudinal support surface.

5. A folding hood according to claim 4, wherein the projecting support section includes an elastic rubber section which is secured by a securing arm said securing arm lying on a top surface of the material-retaining hoop.

6. A folding hood according to claim 5, wherein the securing arm, viewed in cross-section, makes a transition into said projecting support section, said transition forms a longitudinal groove, said elastic rubber section being thickened in a bead shape, the elastic rubber section extending substantially laterally relative to the bearing section.

7. A folding hood according to claim 4, wherein the material-retaining hoop is curved in its central region, lying below the rear window, said curve having a radius of curvature which differs from a radius of curvature of the rear window in its widthwise direction, the bearing section being a compensating section for the difference in curvatures.

8. A folding hood according to claim 4, wherein the bearing section has an approximately L-shaped cross-section over the width of the window and is designed as a masking section for the material-retaining hoop, the bearing section covering the one arm of said L-shaped cross-section an inner circumferential surface of the material-retaining hoop and with the other arm, which holds the projecting support section, the top of the material-retaining hoop.

9. A folding hood according to claim 2, wherein the window frame comprises a plurality of frame parts, said frame parts being which are connected to each other via screw fixing means in an overlap region, the screw fixing means being masked along the lower part of the window frame via the support device.

10. A folding hood according to claim 5, wherein the rubber section bears, on its longitudinal side, under prestress on an interior surface of the window frame.

11. A folding hood according to claim 1, wherein the rear window is formed of mineral glass.

* * * * *